United States Patent
Hara et al.

(10) Patent No.: US 11,652,202 B2
(45) Date of Patent: May 16, 2023

(54) POSITIVE ELECTRODE FOR NON-AQUEOUS ELECTROLYTE SECONDARY BATTERY, AND NON-AQUEOUS ELECTROLYTE SECONDARY BATTERY

(71) Applicant: ELIIY Power Co., Ltd., Tokyo (JP)

(72) Inventors: Tomitaro Hara, Shinagawa-ku (JP); Takao Fukunaga, Shinagawa-ku (JP); Yusuke Kuzushima, Shinagawa-ku (JP)

(73) Assignee: ELIIY POWER CO., LTD, Tokyo (JP)

( * ) Notice: Subject to any disclaimer, the term of this patent is extended or adjusted under 35 U.S.C. 154(b) by 0 days.

(21) Appl. No.: 16/300,674

(22) PCT Filed: May 12, 2016

(86) PCT No.: PCT/JP2016/064162
§ 371 (c)(1),
(2) Date: Nov. 12, 2018

(87) PCT Pub. No.: WO2017/195330
PCT Pub. Date: Nov. 16, 2017

(65) Prior Publication Data
US 2019/0288275 A1    Sep. 19, 2019

(51) Int. Cl.
*H01M 4/62* (2006.01)
*H01M 4/36* (2006.01)
(Continued)

(52) U.S. Cl.
CPC .......... *H01M 4/133* (2013.01); *H01M 4/136* (2013.01); *H01M 4/36* (2013.01); *H01M 4/362* (2013.01);
(Continued)

(58) Field of Classification Search
None
See application file for complete search history.

(56) References Cited

U.S. PATENT DOCUMENTS

2009/0068560 A1   3/2009   Hasumi et al.
2009/0148771 A1   6/2009   Ishii et al.
(Continued)

FOREIGN PATENT DOCUMENTS

EP   1 414 087 A1   4/2004
EP   2 654 108 A1   10/2013
(Continued)

OTHER PUBLICATIONS

Sigma-Aldrich, Carbon nanotube, single-walled specification sheet (https://www.sigmaaldrich.com/US/en/product/aldrich/775533). No date.*
European Patent Office, Extended European Search Report issued in corresponding Application No. 16 90 1678.9 dated Sep. 26, 2019.

*Primary Examiner* — Tracy M Dove
(74) *Attorney, Agent, or Firm* — Stites & Harbison, PLLC; Terry L. Wright; Jeffrey A. Haeberlin

(57) ABSTRACT

The present invention provides a positive electrode for non-aqueous electrolyte secondary battery, having a novel overcharge protective function. The positive electrode for non-aqueous electrolyte secondary battery according to the present invention includes a positive electrode active material layer including a plurality of positive electrode active material particles, wherein the positive electrode active material layer comprises: a carbonaceous coating film formed on a surface of each of the positive electrode active material particles; and 0% by weight or more and 20% by weight or less of a conductive auxiliary agent disposed between the plurality of positive electrode active material particles, and at least one of the carbonaceous coating film and the conductive auxiliary agent is graphitizable carbon.

5 Claims, 9 Drawing Sheets

(51) Int. Cl.
  *H01M 4/133* (2010.01)
  *H01M 10/0525* (2010.01)
  *H01M 4/136* (2010.01)
  *H01M 10/0563* (2010.01)
  *H01M 4/58* (2010.01)
  *H01M 4/583* (2010.01)
  *H01M 4/52* (2010.01)
  *H01M 10/0566* (2010.01)
  *H01M 4/02* (2006.01)

(52) U.S. Cl.
  CPC .............. *H01M 4/523* (2013.01); *H01M 4/58* (2013.01); *H01M 4/583* (2013.01); *H01M 4/5825* (2013.01); *H01M 4/62* (2013.01); *H01M 4/625* (2013.01); *H01M 10/0525* (2013.01); *H01M 10/0563* (2013.01); *H01M 10/0566* (2013.01); *H01M 2004/021* (2013.01); *H01M 2004/028* (2013.01); *H01M 2300/002* (2013.01)

(56) References Cited

U.S. PATENT DOCUMENTS

| | | | |
|---|---|---|---|
| 2012/0321953 A1* | 12/2012 | Chen | H01M 4/483 977/773 |
| 2013/0266843 A1* | 10/2013 | Hara | H01M 4/136 429/149 |
| 2014/0023926 A1* | 1/2014 | Li | H01M 4/139 429/223 |
| 2014/0127575 A1 | 5/2014 | Scrosati et al. | |
| 2014/0178761 A1* | 6/2014 | Lu | H01M 4/049 429/225 |
| 2015/0162610 A1 | 6/2015 | Hydro-Quebec et al. | |

FOREIGN PATENT DOCUMENTS

| | | |
|---|---|---|
| JP | 2000-164206 A | 6/2000 |
| JP | 2007-59142 A | 3/2007 |
| JP | 2015-65134 A | 4/2015 |
| JP | 2015-070032 A | 4/2015 |

\* cited by examiner

[FIG. 1]
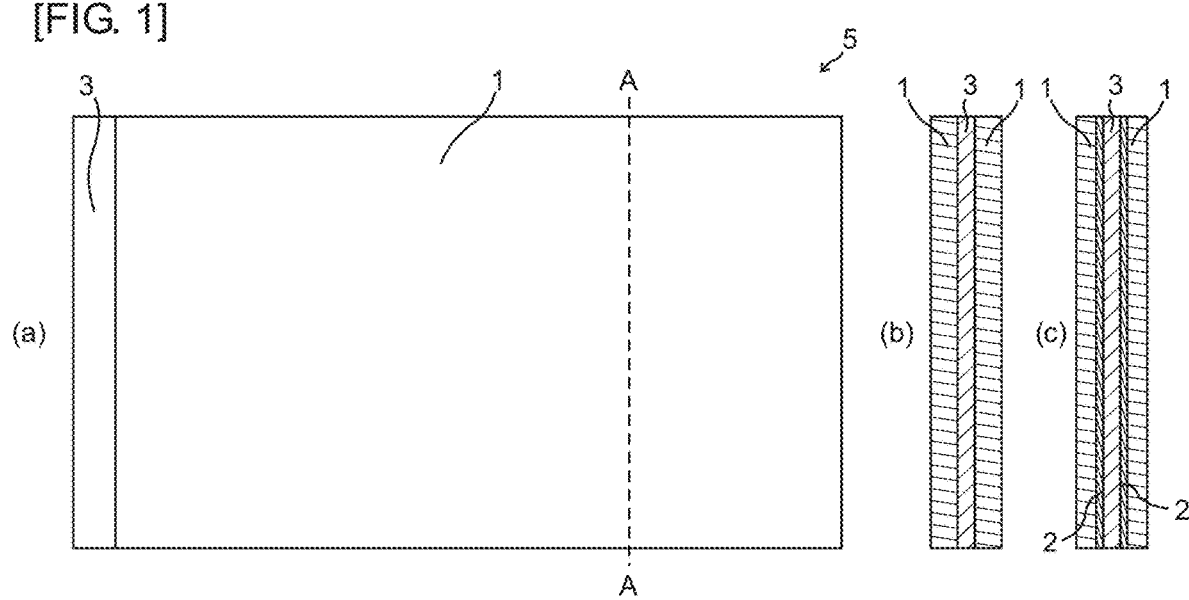
[FIG. 2]
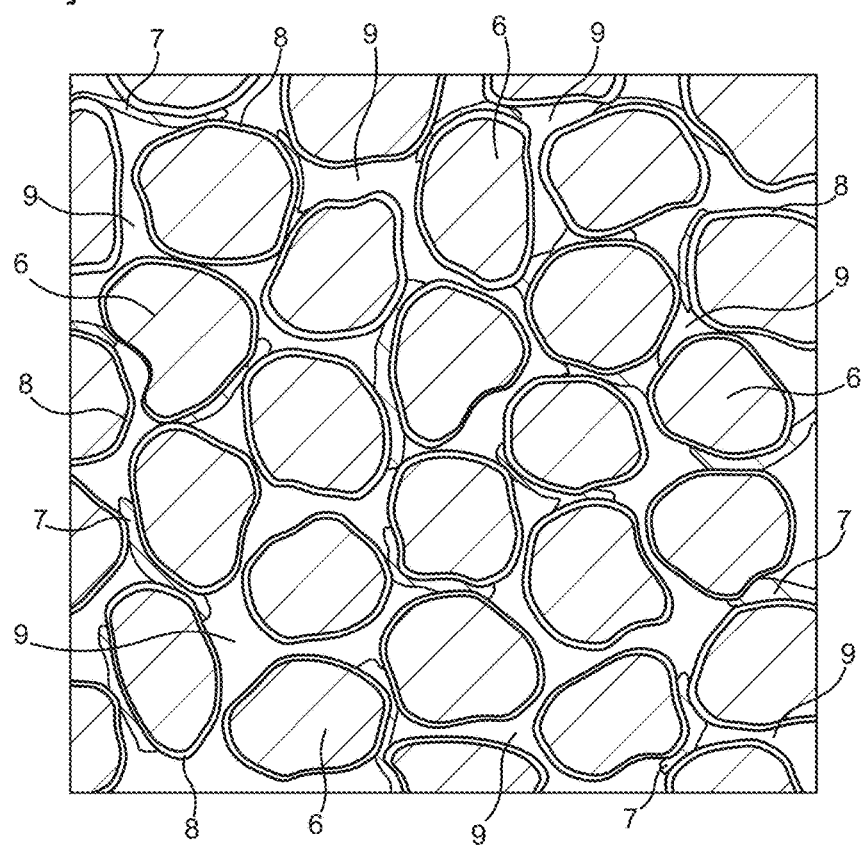

[FIG. 3]
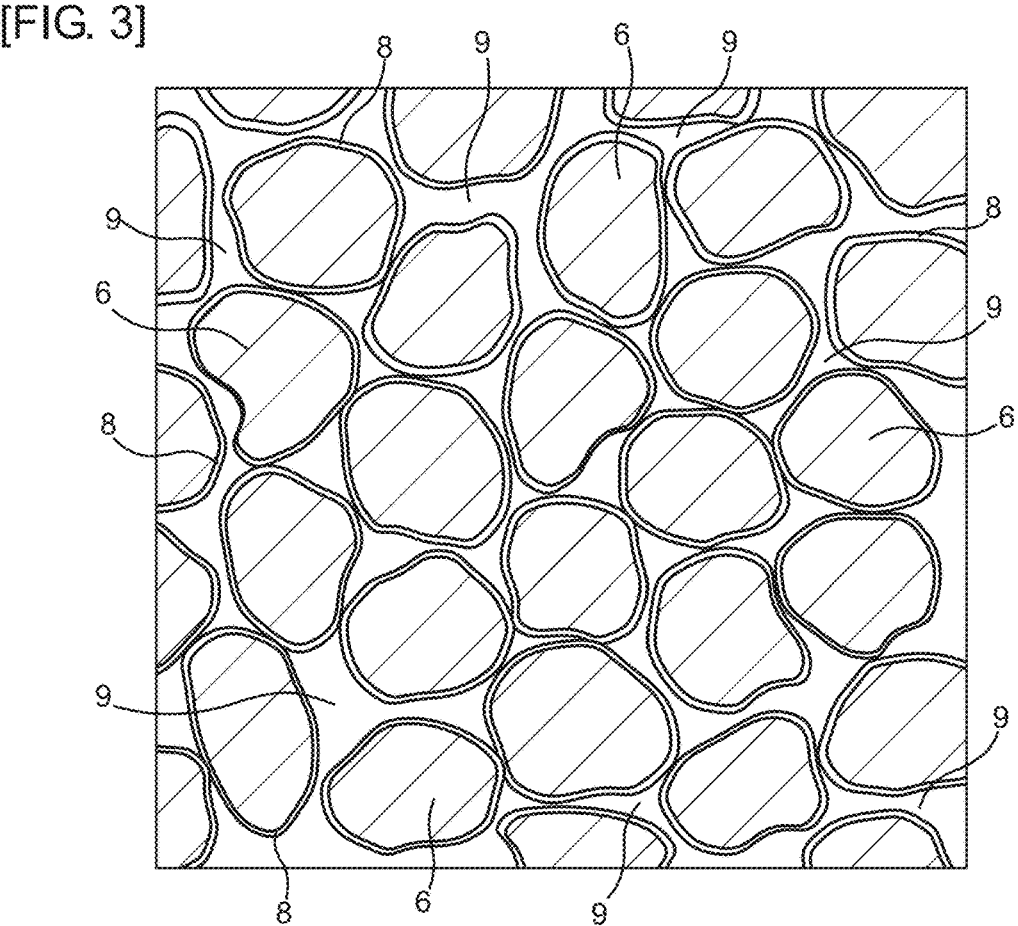
[FIG. 4]
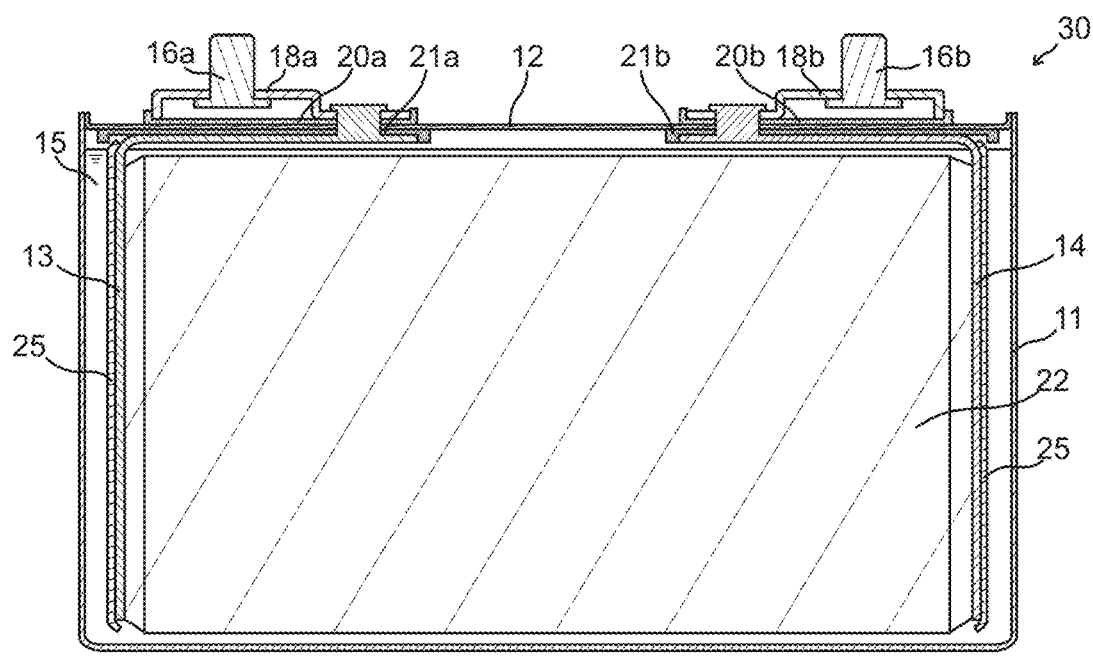

[FIG. 5]
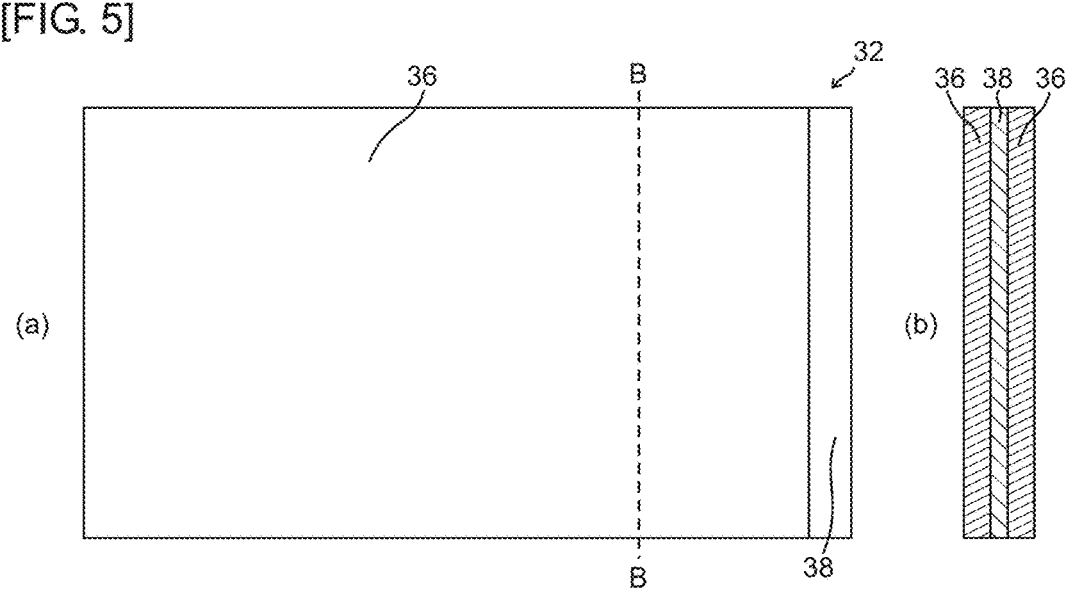
[FIG. 6]
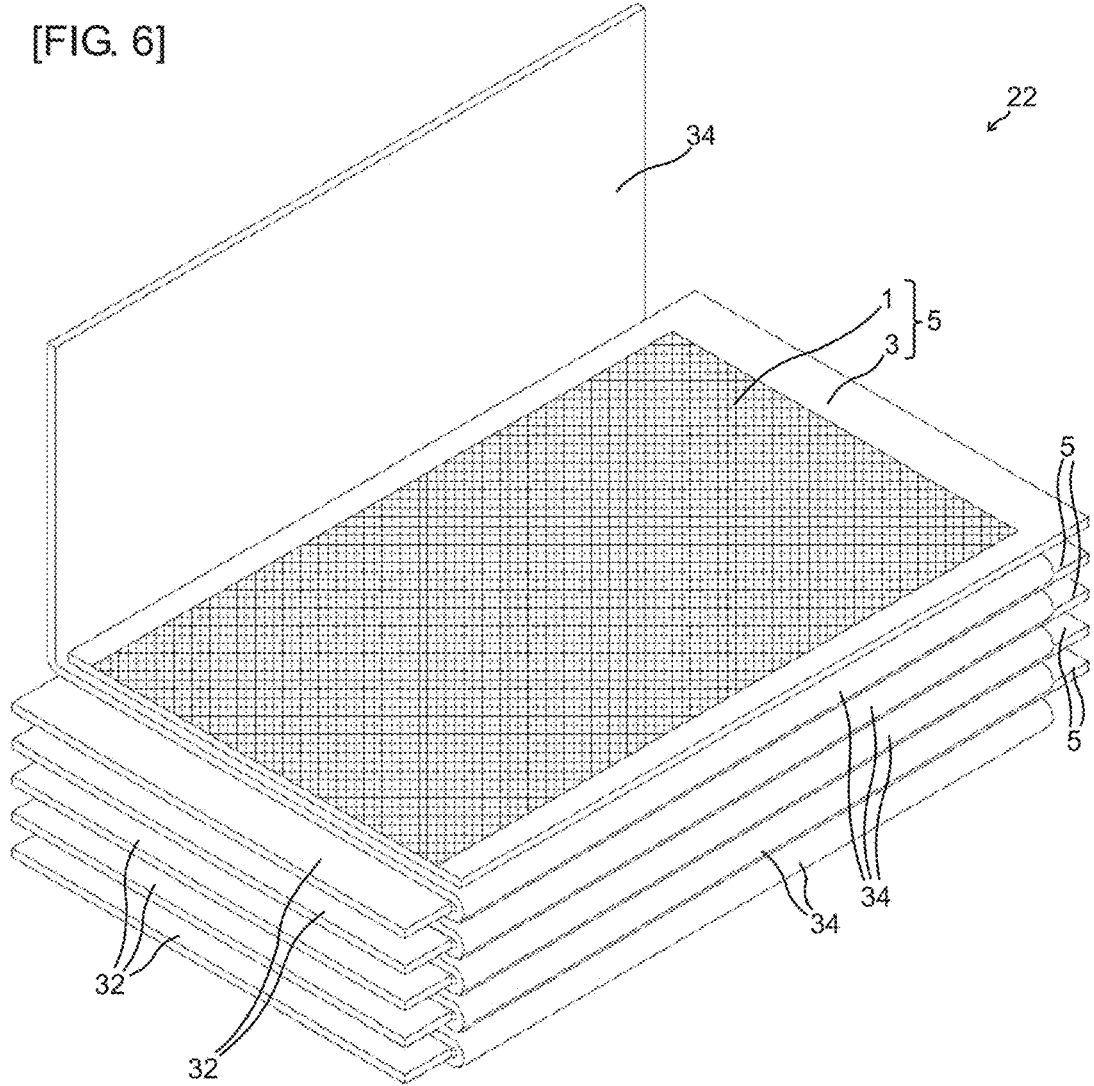

[FIG. 7]
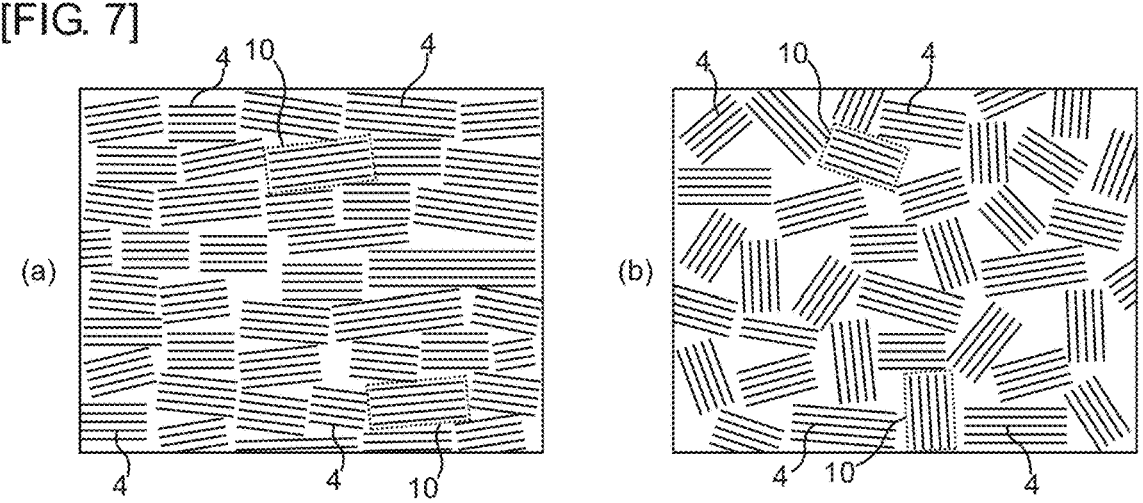
[FIG. 8]
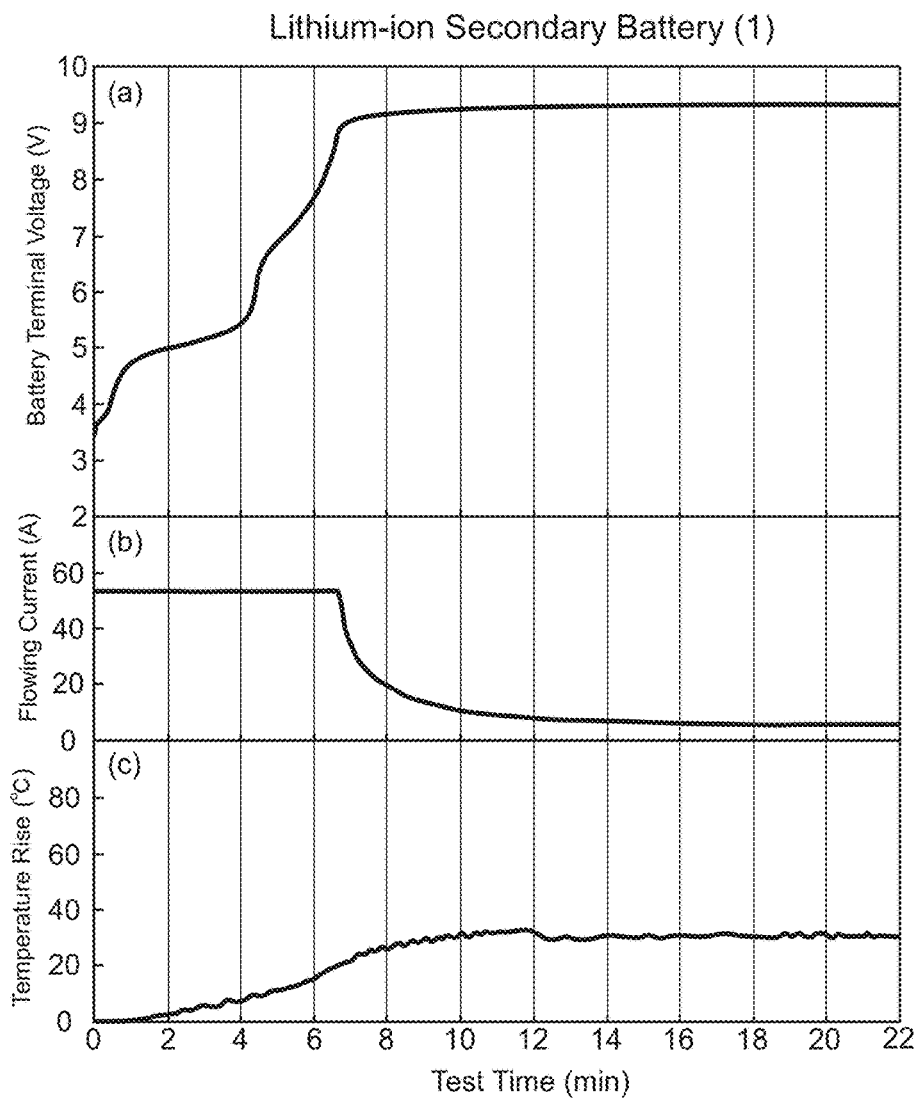

[FIG. 9]
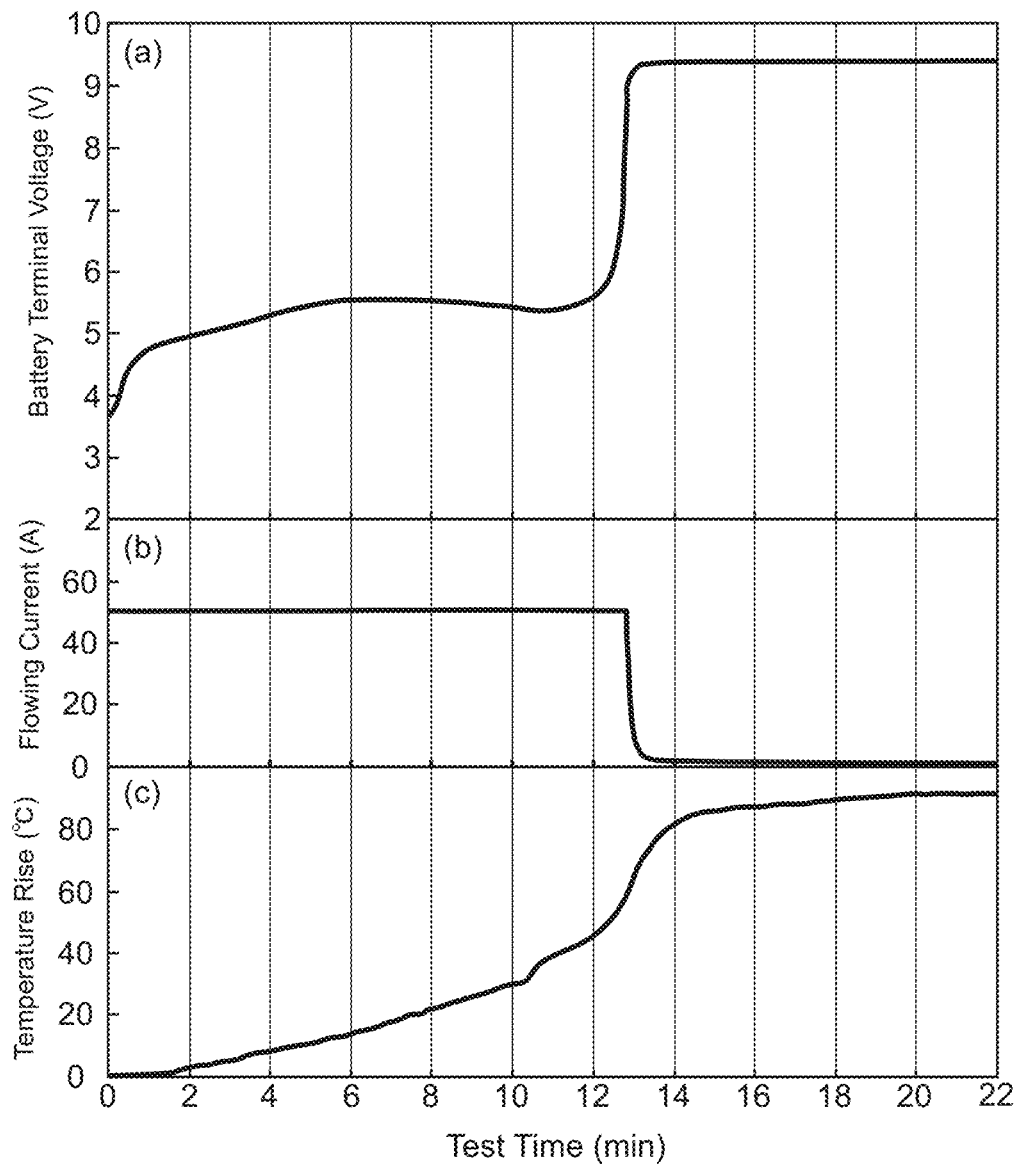

[FIG. 10]
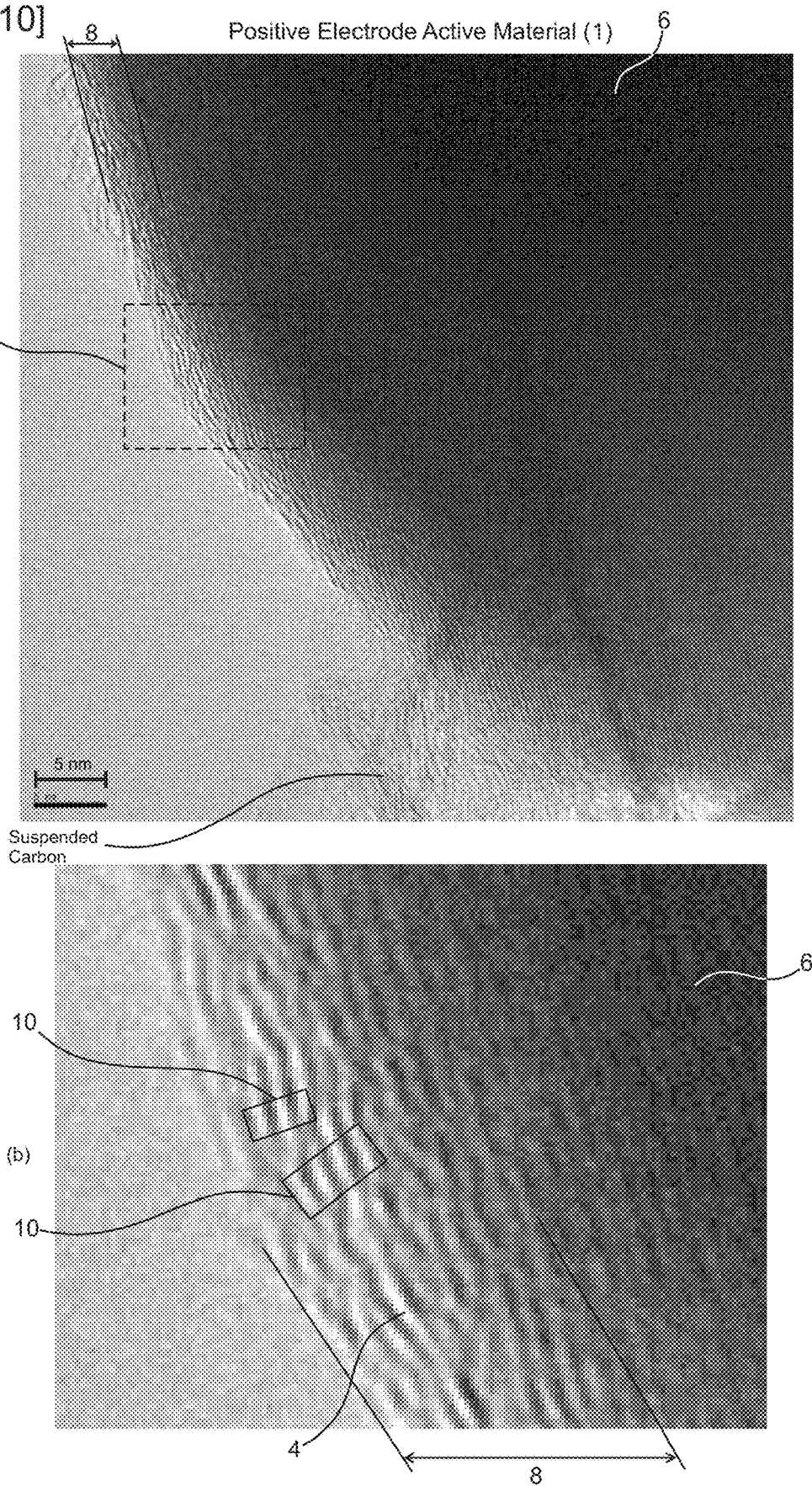

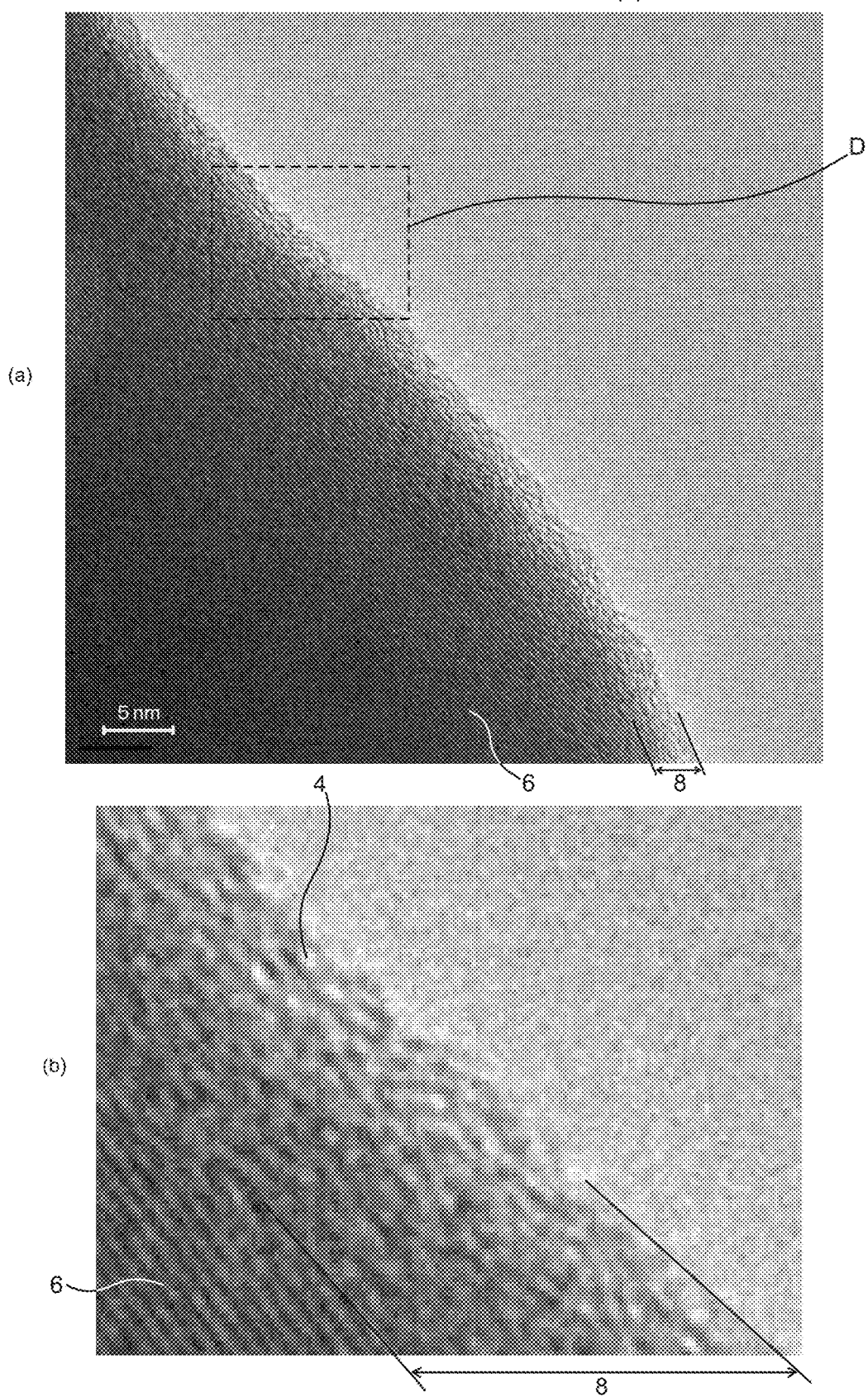
[FIG. 11]

[FIG. 12]
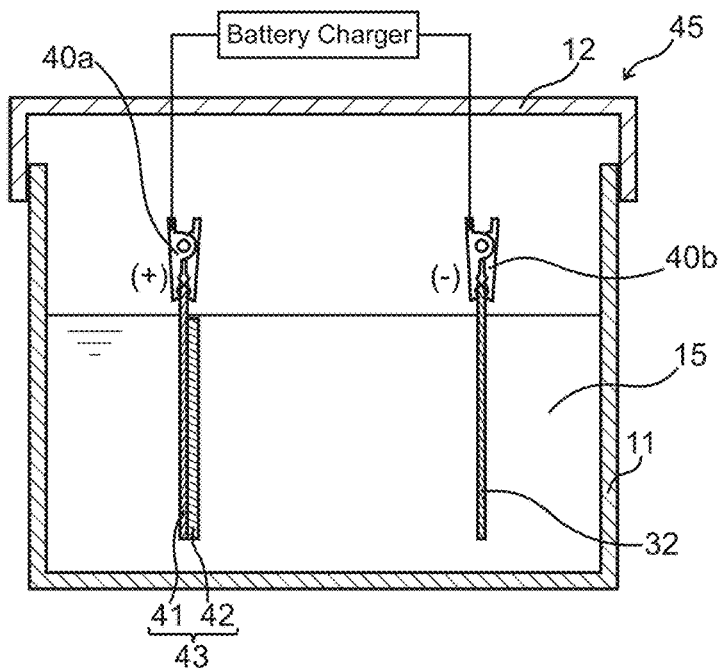
[FIG. 13]
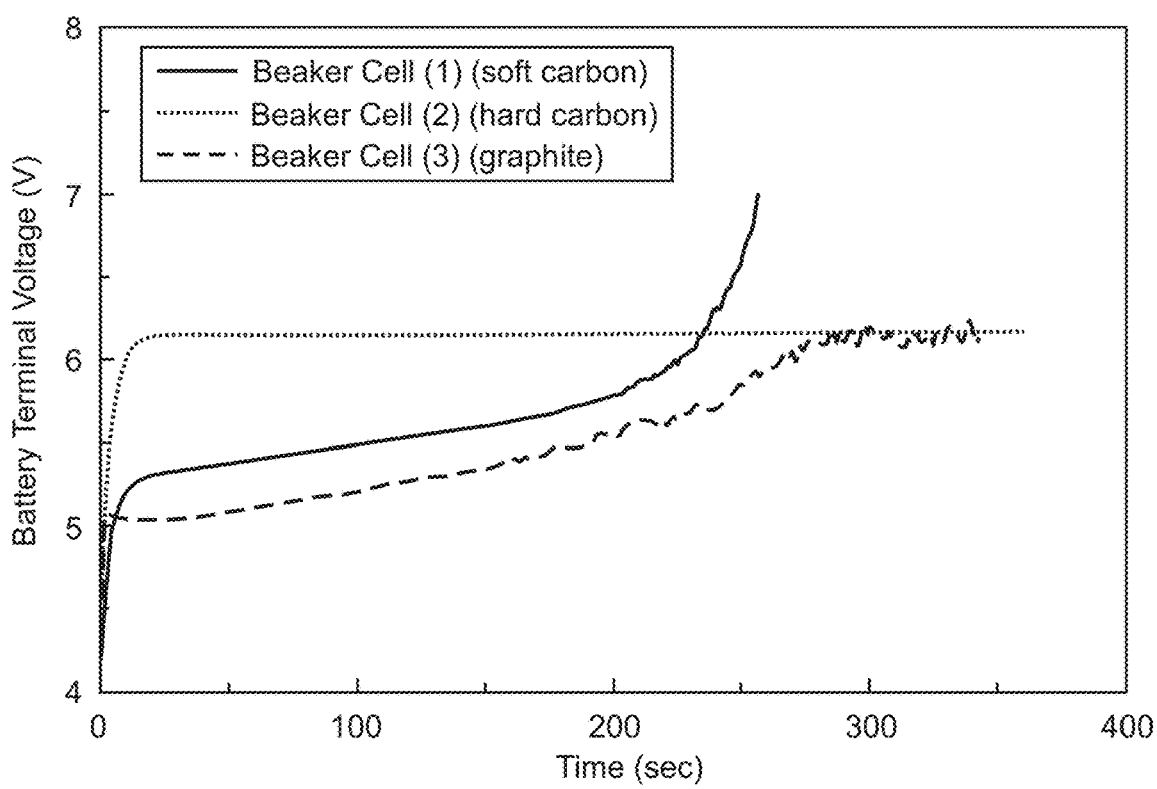

[FIG. 14]
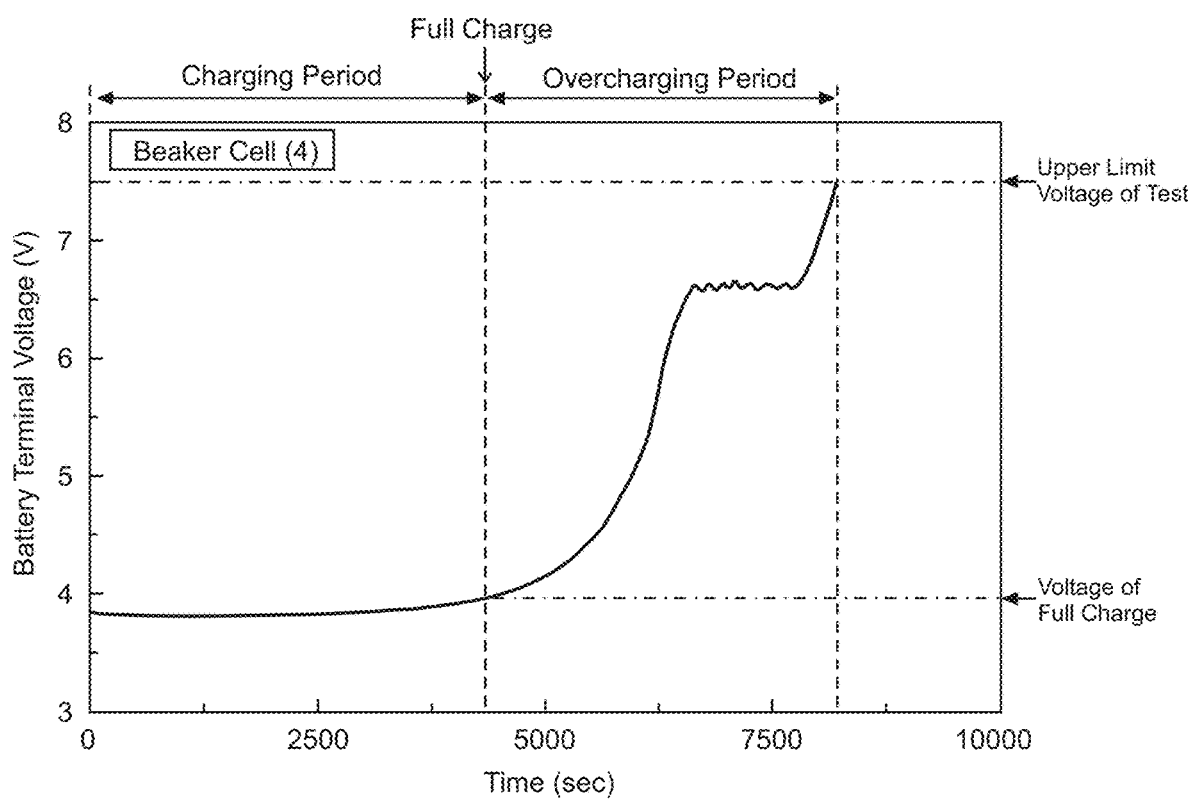

POSITIVE ELECTRODE FOR NON-AQUEOUS ELECTROLYTE SECONDARY BATTERY, AND NON-AQUEOUS ELECTROLYTE SECONDARY BATTERY

TECHNICAL FIELD

The present invention relates to a positive electrode for non-aqueous electrolyte secondary battery and to a non-aqueous electrolyte secondary battery.

BACKGROUND ART

Non-aqueous electrolyte type lithium ion secondary batteries have been recently put to practical use as small-sized, light-weight, and chargeable/dischargeable batteries having high capacity.

In lithium ion secondary batteries, non-aqueous electrolyte solutions each obtained by dissolving a lithium salt in a non-aqueous solvent as an electrolyte solution are usually used.

Because these non-aqueous electrolyte solutions are made of flammable materials, batteries used heretofore include a safety mechanism such as a safety valve and separator.

These batteries have a structure in which a safety valve is cleft to release an increased internal pressure of the battery and to thereby prevent the battery from being broken when the battery is put in an abnormal state, for example, in a case where the battery generates heat caused by, for example, overcharge.

Also, these batteries have a structure in which pores formed in a separator are blocked (shutdown) to shut paths of conductor ions in the battery when battery temperature reaches about 120° C. in order to prevent further proceeding of reaction when the battery is put in an abnormal state, for example, in a case where the battery generated heat caused by, for example, overcharge.

A positive electrode active material is known which includes a carbonaceous coating film with which surfaces of olivine-based inorganic particles are coated (see, for example, Patent Document 1). Also, the positive electrode active material layer is usually formed by blending a positive electrode active material, a conductive auxiliary agent such as acetylene black, and a binder. Accordingly, the positive electrode active material layer contains a carbon material as the carbonaceous coating film or conductive auxiliary agent.

The carbon material may be generally classified into a carbon material having a certain crystal structure such as graphite and fullerene, and amorphous carbon (microcrystalline carbon). Also, the amorphous carbon may be generally classified into graphitizable carbon (soft carbon) and non-graphitizable carbon (hard carbon).

The graphitizable carbon is a carbon material that is easily made into graphite by high-temperature treatment. Also, the graphitizable carbon is generally amorphous carbon that is an aggregate of a plurality of basic structure units (BSU) and has an oriented structure in which the plurality of basic structure units are oriented. The basic structure unit is a structure unit in which a plurality of carbon hexagonal network planes are laminated and microscopically has a structure analogous to graphite. Also, carbon materials obtained by heat-treatment of pitches, graphitizable cokes, and the like are generally categorized as the graphitizable carbon (see, for example, Patent Document 2).

The non-graphitizable carbon is a carbon material of which progress of graphitization is slow in high-temperature treatment. Also, the non-graphitizable carbon is generally amorphous carbon in which a plurality of basic structure units are assembled and has an unoriented structure in which the plurality of basic structure units are not oriented. Generally, carbon materials obtained by heat-treatment of thermosetting resins, carbon black, non-graphitizable cokes, carbon materials obtained by heat-treatment of vegetable type raw materials, and the like are categorized as the non-graphitizable carbon (see, for example, Patent Document 2).

PRIOR ART DOCUMENTS

Patent Documents

Patent Document 1: JP-A No. 2015-65134
Patent Document 2: JP-A No. 2015-070032

SUMMARY OF THE INVENTION

Problems to be Solved by the Invention

However, a safety mechanism like those having conventional structures causes an electrolyte solution inside a battery to be boiled by exothermal influence exerted when a battery is overcharged, so that a battery safety valve is opened. When the safety valve is opened, the electrolyte solution in the battery blows around the battery with a possibility of exerting adverse influence on peripheral devices.

Also, when a method in which a path of conductive ions in a separator is blocked by heat is used as a mechanism for stopping an abnormal state where the battery is overcharged, a kind of a separator material is limited and in addition, when progress of generation of exothermic heat is excessive, this causes, for example, shrinkage of an entire separator, which damages a function of preventing development of short circuit between positive and negative electrodes, bringing about a possibility that a function of stopping an abnormal state does not work.

Besides protection mechanisms such as a safety valve and a separator, necessities for further safety mechanisms arise, while there is an increased demand for safety of protective function at a time of overcharging.

In light of this situation, the present invention has been made and provides a positive electrode for non-aqueous electrolyte secondary battery having a novel overcharge protective function.

Solutions to the Problems

The present invention provides a positive electrode for non-aqueous electrolyte secondary battery, the positive electrode including a positive electrode active material layer containing a plurality of positive electrode active material particles, wherein the positive electrode active material layer includes: a carbonaceous coating film formed on a surface of each of the positive electrode active material particles; and 0% by weight or more and 20% by weight or less of a conductive auxiliary agent disposed between the plurality of positive electrode active material particles, and at least one of the carbonaceous coating film and the conductive auxiliary agent is graphitizable carbon.

Effects of the Invention

A positive electrode for non-aqueous electrolyte secondary battery according to the present invention includes a positive electrode active material layer containing a plurality of positive electrode active material particles. Therefore, an electrode reaction (for example, intercalation of ions into a positive electrode active material and deintercalation of ions from the positive electrode active material) can be promoted in the positive electrode active material particles in association with charging/discharging, and therefore a non-aqueous electrolyte secondary battery can be charged/discharged.

The positive electrode active material layer includes a carbonaceous coating film formed on a surface of each of the positive electrode active material particles and 0% by weight or more and 20% by weight or less of a conductive auxiliary agent disposed between the plurality of positive electrode active material particles. Therefore, the carbonaceous coating film or conductive auxiliary agent can be served as an electronic conduction path, enabling rapid electron transfer associated with the electrode reaction. This can improve battery characteristics. Also, a material having a relatively low conductivity can be used as the positive electrode active material particle.

At least one of the carbonaceous coating film and the conductive auxiliary agent is graphitizable carbon (soft carbon). This ensures that the carbonaceous coating film or conductive auxiliary agent which serves as the electronic conduction path can be made to have high resistance when the non-aqueous electrolyte secondary battery is put into an overcharged state. It has been clarified by an experiment made by inventors of the present invention that the graphitizable carbon has a high conductivity when a battery is charged/discharged and is made to have high resistance when the battery is put into an overcharged state. Though this reason has not been clarified, it is inferred that the graphitizable carbon is electrochemically degraded or reacted and resultantly denatured by a positive electrode potential raised by overcharging.

Accordingly, the carbonaceous coating film and the conductive auxiliary agent which serve as electronic conduction paths can be made to have high resistance when a non-aqueous electrolyte secondary battery is put into an overcharged state, making it possible to rapidly reduce charge current flowing in the battery in an overcharged state. This can reduce exothermic heat caused by electrochemical reaction of an electrolyte solution and exothermic heat caused by flow of current in the carbonaceous coating film or conductive auxiliary agent, and therefore rise in temperature of the battery and hence boiling of the electrolyte solution can be restrained. This results in that rise in internal pressure caused by overcharge in the battery can be restrained, ensuring that the battery can be prevented from exploding. In other words, if a positive electrode of the present invention is used, a battery with a positive electrode active material layer having a safety improving mechanism can be manufactured.

Also, because a battery can be manufactured using a separator with no shutdown mechanism, heat resistance of the battery can be improved. Also, a protective circuit can be simplified. Moreover, a safety of a large-capacity battery can be improved.

BRIEF DESCRIPTION OF THE DRAWINGS

FIG. 1(a) is a schematic plan view of a positive electrode for non-aqueous electrolyte secondary battery in an embodiment of the present invention and FIGS. 1(b) and 1(c) are schematic sectional views of the positive electrode along a dotted line A-A of FIG. 1(a).

FIG. 2 is an enlarged sectional view of a positive electrode active material layer contained in the positive electrode for non-aqueous electrolyte secondary battery in an embodiment of the present invention.

FIG. 3 is an enlarged sectional view of the positive electrode active material layer contained in the positive electrode for non-aqueous electrolyte secondary battery in an embodiment of the present invention.

FIG. 4 is a schematic sectional view of the non-aqueous electrolyte secondary battery in an embodiment of the present invention.

FIG. 5(a) is a schematic plan view of a negative electrode contained in the non-aqueous electrolyte secondary battery in an embodiment of the present invention and FIG. 5(b) is a schematic sectional view of the negative electrode along a dotted line B-B of FIG. 5(a).

FIG. 6 is a schematic structural view of a power generation element contained in the non-aqueous electrolyte secondary battery in an embodiment of the present invention.

FIG. 7(a) is an explanatory view of a microstructure of graphitizable carbon and FIG. 7(b) is an explanatory view of a microstructure of non-graphitizable carbon.

FIGS. 8(a) to 8(c) are graphs showing results of an overcharge test (1).

FIGS. 9(a) to 9(c) are graphs showing results of an overcharge test (1).

FIGS. 10(a) and 10(b) are TEM photographs of a positive electrode active material (1).

FIGS. 11(a) and 11(b) are TEM photographs of a positive electrode active material (3).

FIG. 12 is a schematic sectional view of a beaker cell.

FIG. 13 is a graph showing results of a voltage application experiment.

FIG. 14 is a graph showing results of an overcharge test (2).

EMBODIMENTS OF THE INVENTION

A positive electrode for non-aqueous electrolyte secondary battery according to the present invention includes a positive electrode active material layer containing a plurality of positive electrode active material particles, in which the positive electrode active material layer includes a carbonaceous coating film formed on a surface of each of the positive electrode active material particles and 0% by weight or more and 20% by weight or less of a conductive auxiliary agent disposed between the plurality of positive electrode active material particles, and at least one of the carbonaceous coating film and the conductive auxiliary agent is graphitizable carbon.

The carbonaceous coating film and conductive auxiliary agent included in the positive electrode of the present invention are preferably amorphous carbon constituted of an aggregate of a plurality of basic structure units each having a structure in which a plurality of carbon hexagonal network planes are laminated and preferably has an oriented structure in which the plurality of basic structure units are oriented. This ensures that the carbonaceous coating film and the conductive auxiliary agent can be made to have high resistance when a non-aqueous electrolyte secondary battery is put into an overcharged state with a result that exothermic heat of the positive electrode active material layer can be restrained.

The carbonaceous coating film and the conductive auxiliary agent included in the positive electrode of the present invention are preferably those (pitch type carbon materials) obtained by baking pitch type materials. This ensures that the carbonaceous coating film or conductive auxiliary agent can be made to have high resistance when the non-aqueous electrolyte secondary battery is put into an overcharged state.

90% or more of a total amount of the carbonaceous coating film and conductive auxiliary agent included in the positive electrode active material layer of the positive electrode of the present invention is preferably graphitizable carbon. This ensures that the carbonaceous coating film and the conductive auxiliary agent can be made to have high resistance when the non-aqueous electrolyte secondary battery is put into an overcharged state.

The carbonaceous coating film and the conductive auxiliary agent included in the positive electrode of the present invention preferably have a material density of 1.8 g/cm$^3$ or more and 2.1 g/cm$^3$ or less. This ensures that the carbonaceous coating film and the conductive auxiliary agent can be made to have high resistance when the non-aqueous electrolyte secondary battery is put into an overcharged state.

The positive electrode active material particles contained in the positive electrode active material layer of the positive electrode of the present invention is preferably olivine type compound particles or NASICON type compound particles. This ensures that heat stability of a positive electrode active material can be improved and therefore, safety of the non-aqueous electrolyte secondary battery can be improved.

The positive electrode of the present invention preferably includes a positive electrode current collector sheet and the positive electrode active material layer is preferably formed on the positive electrode current collector sheet. This ensures that a conductive distance between the positive electrode current collector sheet and the positive electrode active material can be shortened, enabling rapid electron transfer associated with an electrode reaction.

The positive electrode active material layer included in the positive electrode of the present invention preferably contains substantially no non-graphitizable carbon (hard carbon) and substantially no graphite. This ensures that the positive electrode active material layer can be made to have high resistance when the non-aqueous electrolyte secondary battery is put into an overcharged state with a result that exothermic heat of the battery put into an overcharged state can be restrained.

The present invention also provides a non-aqueous electrolyte secondary battery including the positive electrode of the present invention, a negative electrode having a negative electrode active material, a separator sandwiched between the positive electrode and the negative electrode, a non-aqueous electrolyte, and a battery case in which the positive electrode, the negative electrode, the separator, and the non-aqueous electrolyte are accommodated.

According to the non-aqueous electrolyte secondary battery of the present invention, the positive electrode active material layer can be made to have high resistance when the non-aqueous electrolyte secondary battery is put into an overcharged state with a result that rise in temperature of the battery can be restrained. Accordingly, rise in internal pressure of the battery caused by overcharge can be restrained, ensuring that the battery can be prevented from exploding.

In the secondary battery of the present invention, the negative electrode active material is preferably a carbon material, the non-aqueous electrolyte is preferably an electrolyte solution in which a lithium salt is dissolved in a non-aqueous solvent, and the carbonaceous coating film and the conductive auxiliary agent are preferably graphitizable carbon which is electrochemically degraded or reacted into highly resistant carbon in an overcharged state. This ensures that the rise in the temperature of the battery can be restrained when the non-aqueous electrolyte secondary battery is put into an overcharged state. Accordingly, the rise in the internal pressure of the battery caused by overcharge can be restrained, ensuring that the battery can be prevented from exploding.

An embodiment of the present invention will be described with reference to the drawings. Structures shown in the drawings or the following descriptions are just exemplifications and the scope of the present invention is not limited thereto.

FIG. 1(a) is a schematic plan view of a positive electrode for non-aqueous electrolyte secondary battery in this embodiment and FIGS. 1(b) and 1(c) are schematic sectional views of the positive electrode along a dotted line A-A of FIG. 1(a). FIGS. 2 and 3 are enlarged sectional views of a positive electrode active material layer included in the positive electrode for non-aqueous electrolyte secondary battery in this embodiment. FIG. 4 is a schematic sectional view of the non-aqueous electrolyte secondary battery in this embodiment. FIG. 5(a) is a schematic sectional view of a negative electrode contained in the non-aqueous electrolyte secondary battery in this embodiment and FIG. 5(b) is a schematic sectional view of the negative electrode along a line B-B of FIG. 5(a). FIG. 6 is a schematic structural view of a power generation element contained in the non-aqueous electrolyte secondary battery in this embodiment.

A positive electrode 5 for non-aqueous electrolyte secondary battery in this embodiment includes a positive electrode active material layer 1 containing a plurality of positive electrode active material particles 6, in which the positive electrode active material layer 1 includes a carbonaceous coating film 8 formed on a surface of each of the positive electrode particles 6 and 0% by weight or more and 20% by weight or less of a conductive auxiliary agent 7 disposed between the plurality of positive electrode active material particles, and at least one of the carbonaceous coating film 8 and the conductive auxiliary agent 7 is graphitizable carbon.

A non-aqueous electrolyte secondary battery 30 of this embodiment includes the positive electrode 5 of this embodiment, a negative electrode 32 having a negative electrode active material, a separator 34 sandwiched between the positive electrode 5 and the negative electrode 32, a non-aqueous electrolyte 15, and a battery case 11 in which the positive electrode 5, the negative electrode 32, separator 34, and the non-aqueous electrolyte 15 are accommodated.

The positive electrode 5 for non-aqueous electrolyte secondary battery and the non-aqueous electrolyte secondary battery 30 of this embodiment will be described hereinbelow.

1. Positive Electrode for Non-Aqueous Electrolyte Secondary Battery

The positive electrode 5 for non-aqueous electrolyte secondary battery is a positive electrode constituting the non-aqueous electrolyte secondary battery 30 or a positive electrode used for production of the non-aqueous electrolyte secondary battery 30.

The positive electrode 5 for non-aqueous electrolyte secondary battery includes the positive electrode active material layer 1 containing a plurality of positive electrode active material particles 6. The positive electrode 5 may also include a positive electrode current collector sheet 3 and the positive electrode active material layer 1 may be formed on the positive electrode current collector sheet 3. The positive electrode 5 may have such a structure as illustrated in, for example, FIGS. 1(a) and 1(b). The positive electrode current collector sheet 3 may be formed of, for example, a metal foil such as an aluminum foil. The positive electrode 5 may also include a base layer 2 between the positive electrode current collector sheet 3 and the positive electrode active material layer 1. The base layer 2 may be formed as shown in FIG. 1(c).

The positive electrode active material layer 1 may be a porous layer containing the positive electrode active material particle 6 and a binder. The positive electrode active material layer 1 includes at least one of the carbonaceous coating film 8 formed on the surface of the positive electrode active material particle 6 and conductive auxiliary agent 7 disposed between the plurality of positive electrode active material particles 6. Also, the carbonaceous coating film 8 and the conductive auxiliary agent 7 are graphitizable carbon (soft carbon).

The positive electrode active material layer 1 may have both of the carbonaceous coating film 8 formed on the surface of the positive electrode active material particle 6 and conductive auxiliary agent 7 disposed between the plurality of positive electrode active material particles 6. In this case, the carbonaceous coating film 8 and conductive auxiliary agent 7 are both graphitizable carbon. For example, the positive electrode active material layer 1 may have such a microstructure as shown in FIG. 2. The positive electrode active material layer 1 as mentioned above may be formed by blending positive electrode active material powder with the carbonaceous coating film 8 formed thereon, the conductive auxiliary agent 7 and a binder to prepare a paste and by applying this paste to the surface of the positive electrode current collector sheet 3. Examples of a solvent used in the preparation of the paste include dimethylformamide, N-methyl pyrrolidone, isopropanol, and toluene. Also, the positive electrode active material layer 1 may contain 0% by weight or more and 20% by weight or less of conductive auxiliary agent. The conductive auxiliary agent is expected to have an effect on improvement in output. However, if an amount of the conductive auxiliary agent is excessive, a capacity per volume of the electrode is reduced and therefore the amount of the conductive auxiliary agent is preferably 20% by weight or less.

The carbonaceous coating film 8 can be formed, for example, by forming a coating layer of an organic compound on the surface of the positive electrode active material particle 6 and by heat-treating this coating layer in a non-oxidizing atmosphere to carbonize the layer. The above organic compound may be petroleum pitch or coal pitch. This allows the carbonaceous coating film 8 to be a pitch type carbon material that is graphitizable carbon. Also, the aforementioned heat treatment may be performed at, for example, 500° C. or higher and 1000° C. or lower.

For example, cokes-based soft carbon that is graphitizable carbon may be used as the conductive auxiliary agent 7.

The positive electrode active material layer 1 includes the carbonaceous coating film 8 formed on the surface of the positive electrode active material particle 6 and may include substantially no conductive auxiliary agent 7. In this case, the carbonaceous coating film 8 is graphitizable carbon. For example, the positive electrode active material layer 1 may have a microstructure as shown in FIG. 3. The positive electrode active material layer 1 may be formed, for example, by blending positive electrode active material powder with the carbonaceous coating film 8 formed thereon and a binder to prepare a paste and by applying the paste to the surface of the positive electrode current collector sheet 3.

It has been clarified by a voltage application experiment mentioned later that graphitizable carbon is made to have high resistance in an overcharged state. Since the positive electrode active material layer 1 has such a structure as mentioned above, the positive electrode active material layer 1 can be made to have high resistance when the non-aqueous electrolyte secondary battery 30 is put into an overcharged state and therefore, charge current flowing in the battery 30 put into an overcharged state can be rapidly reduced. This can reduce exothermic heat caused by an electrochemical reaction of an electrolyte solution 15 and exothermic heat caused by current flow in the carbonaceous coating film 8 or conductive auxiliary agent 7, and therefore the rise in the temperature of the battery 30 and hence boiling of the electrolyte solution 15 can be restrained. This results in that the rise in internal pressure caused by overcharge in the battery 30 can be restrained, ensuring that the battery 30 can be prevented from exploding.

The graphitizable carbon (soft carbon) is a carbon material that is easily converted into graphite by high-temperature treatment. Also, the graphitizable carbon is amorphous carbon that is an aggregate of a plurality of basic structure units 10 (BSU) as shown, for example, by a microstructure illustrated in FIG. 7(a) and has an oriented structure in which the plurality of basic structure units 10 are oriented. The basic structure unit 10 is a structural unit in which a plurality of carbon hexagonal network planes 4 are laminated and microscopically has a structure analogous to graphite. The basic structure unit 10 may be a crystallite. It is therefore able to confirm whether the carbonaceous coating film 8 and the conductive auxiliary agent 7 contained in the positive electrode active material layer 1 are graphitizable carbon or not by performing transmission type electron microscopy observation or making an X-ray diffraction measurement or Raman spectrum measurement.

90% or more of a total amount of the carbonaceous coating film 8 and the conductive auxiliary agent 7 included in the positive electrode active material layer 1 may be graphitizable carbon. This can be checked by confirming whether 90% or more of the total amount of the carbonaceous coating film 8 and the conductive auxiliary agent 7 included in a transmission electron microphotograph of the positive electrode active material layer 1 is graphitizable carbon or not. Also, this can be confirmed by an X-ray diffraction measurement.

Generally, carbon materials obtained by heat-treating pitches such as petroleum pitch and coal pitch and graphitizable cokes are categorized as graphitizable carbon. It is therefore possible to confirm whether or not the carbonaceous coating film 8 and the conductive auxiliary agent 7 contained in the positive electrode active material layer 1 are graphitizable carbon by investigating a raw material and heat-treating temperature of the carbonaceous coating film 8 and the conductive auxiliary agent 7.

Also, the carbonaceous coating film 8 and the conductive auxiliary agent 7 may be graphitizable carbon having a material density of 1.8 g/cm$^3$ or more and 2.1 g/cm$^3$ or less. Because, generally, graphitizable carbon has a larger material density than non-graphitizable carbon, it is therefore possible to confirm whether the carbonaceous coating film 8 and the conductive auxiliary agent 7 are graphitizable carbon or not by investigating the material densities of the carbonaceous coating film 8 and conductive auxiliary agent 7.

In a case where the base layer 2 is formed between the positive electrode current collector sheet 3 and positive electrode active material layer 1, the base layer 2 may be a carbon layer containing graphitizable carbon. This makes the carbon layer have a high conductivity, enabling rapid electron transfer associated with an electrode reaction (intercalation of ions into a positive electrode active material and deintercalation of ions from the positive electrode active material) in the positive electrode active material particles 6. Also, the base layer 2 can be made to have high resistance when the non-aqueous electrolyte secondary battery 30 is put into an overcharged state, which makes it possible to restrain large current from flowing between the positive electrode current collector sheet 3 and the positive electrode active material layer 1. This can reduce the exothermic heat caused by the electrochemical reaction of the electrolyte solution 15 and the exothermic heat caused by current flow in the carbonaceous coating film 8 or conductive auxiliary agent 7, and therefore the rise in the temperature of the battery 30 an be restrained. Also, the base layer 2 may be a porous layer containing graphitizable carbon particles and a binder.

In this case, the base layer 2 may be formed by blending graphitizable carbon powder and a binder to prepare a paste and by applying this paste to a surface of the positive electrode current collector sheet 3. Also, the positive electrode active material layer 1 may be formed on the base layer 2.

On the other hand, the non-graphitizable carbon (hard carbon) is a carbon material slow in progress of graphitization in high-temperature treatment. Also, the non-graphitizable carbon is amorphous carbon which has a microstructure as shown in FIG. 7(*b*) and an aggregate of a plurality of basic structure units 10, and it has a non-oriented structure in which a plurality of basic structure units 10 are not oriented. Also, generally, carbon materials obtained by heat-treatment of thermosetting resins, carbon black, non-graphitizable cokes, carbon materials obtained by heat-treatment of vegetable type raw materials, and the like are categorized as the non-graphitizable carbon.

In addition, it has been clarified by a voltage application experiment described later that non-graphitizable carbon and graphite are not made to have high resistance in an overcharged state.

The positive electrode material particles 6 may be particles of a substance (olivine type compound) having an olivine type crystal structure. Examples of the olivine type compound include $LiFePO_4$ and $Li_xM_yPO_4$ (where, $0.05 \leq x \leq 1.2$, $0 \leq y \leq 1$, and M is at least one or more of Fe, Mn, Cr, Co, Cu, Ni, V, Mo, Ti, Zn, Al, Ga, Mg, B, and Nb).

Also, the positive electrode active material particles 6 may be particles of a NASICON type compound represented by $Y_xM_2(PO_4)_3$. The NASICON type compound has a rhombohedral structure and examples of the NASICON type compound include $Li_{3+x}Fe_2(PO_4)_3$, $Li_{2+x}FeTi(PO_4)_3$, $Li_xTiNb(PO_4)_3$, and $Li_{1+x}FeNb(PO_4)_3$.

Also, the positive electrode active material particles 6 may be particles of lithium transition metal composite oxide (for example, a layered type and spinel) capable of insertion and extraction of lithium ions reversibly.

Also, the positive electrode active material layer 1 may include either only one type or plural types of the aforementioned positive electrode active material particle 6.

Also, the positive electrode active material particles 6 may be, as particles of sodium transition metal composite oxide, particles of oxides represented by $Na_bM^2_cSi_{12}O_{30}$ such as $Na_6Fe_2Si_{12}O_{30}$ and $Na_2Fe_5Si_{12}O_{30}$ ($M^2$ is one or more types of transition metal element, $2 \leq b \leq 6$, $2 \leq c \leq 5$); particles of oxides represented by $Na_dM^3_eSi_6O_{18}$ such as $Na_2Fe_2Si_6O_{18}$ and $Na_2MnFeSi_6O_{18}$ ($M^3$ is one or more types of transition metal element, $3 \leq d \leq 6$, $1 \leq e \leq 2$); particles of oxides represented by $Na_fM^4_gSi_2O_6$ represented by $Na_2FeSiO_6$ ($M^4$ is one or more types of element selected from the group consisting of transition metal elements, Mg, and Al, $1 \leq f \leq 2$, $1 \leq g \leq 2$); particles of phosphates such as $NaFePO_4$ and $Na_3Fe_2(PO_4)_3$; particles of borates such as $NaFeBO_4$ and $Na_3Fe_2(BO_4)_3$; particles of fluorides represented by $Na_hM^5F_6$ such as $Na_3FeF_6$ and $Na_2MnF_6$ ($M_5$ is one or more types of transition metal element, $2 \leq h \leq 3$); or the like.

Also, the positive electrode active material layer 1 may contain either only one type or plural types as the aforementioned positive electrode active material particles 6.

Examples of the binder contained in the positive electrode active material layer 1 include polyvinylidene fluoride (PVdF), polytetrafluoroethylene (PTFE), styrene-butadiene copolymer (SBR), acrylonitrile rubber, and acrylonitrile rubber-PTFE mixture.

2. Non-Aqueous Electrolyte Secondary Battery

The non-aqueous electrolyte secondary battery 30 includes the aforementioned positive electrode 5, a negative electrode 32, a separator 34 sandwiched between the positive electrode 5 and negative electrode 32, a non-aqueous electrolyte 15, and a battery case 11 in which the positive electrode 5, the negative electrode 32, the separator 34, and the non-aqueous electrolyte 15 are accommodated. The non-aqueous electrolyte secondary battery 30 is, for example, a lithium ion secondary battery or sodium ion secondary battery.

The non-aqueous electrolyte secondary battery 30 includes the positive electrode 5 for non-aqueous electrolyte secondary battery. Because the details of the positive electrode 5 for non-aqueous electrolyte secondary battery has been explained above, the explanations of the positive electrode 5 are omitted here. It is noted that the positive electrode 5 can constitute a power generation element 22 as shown in FIG. 6 together with the negative electrode 32 and the separator 34.

The negative electrode 32 has a porous negative electrode active material layer 36 containing a negative electrode active material. Also, the negative electrode 32 may include a negative electrode current collector sheet 38.

The negative electrode active material layer 36 may contain a negative electrode active material, a conductive agent, a binder, and the like.

Examples of the negative electrode active material include graphite, partially graphitized carbon, hard carbon, soft carbon, $LiTiO_4$, Sn, and Si. Also, the negative electrode active material layer 36 may contain either only one type or plural types of the aforementioned negative electrode active material.

The negative electrode active material layer 36 may be formed on the negative electrode current collector sheet 38. The negative electrode active material layer 36 may be formed on each main surface of the negative electrode current collector sheet 38 as shown by the negative electrode 32 illustrated in FIGS. 5(*a*) and 5(*b*).

The separator 34 has a sheet-like form and is disposed between the positive electrode 5 and the negative electrode 32. Also, the separator 34 can constitute a power generation element 22 as shown in FIG. 6 together with the positive electrode 5 and the negative electrode 32. The installation of the separator 34 can prevent short-circuit current from flowing between the positive electrode 5 and the negative electrode 32.

Although any material may be used as the separator 34 without any particular limitation as long as it can prevent the flow of short-circuit current and transmit ions conducted between the positive and negative electrodes, the separator 34 may be formed from, for example, a polyolefin microporous film, cellulose sheet, or aramid sheet.

The battery case 11 is a container to accommodate the positive electrode 5, the negative electrode 32, the separator 34, and the non-aqueous electrolyte 15. Also, the battery case 11 may have an opening covered by a lid member 12. The power generation element 22 can be thereby stored in the battery case 11.

The non-aqueous electrolyte 15 is stored in the battery case 11 to serve as an ion conductive medium between the positive and negative electrodes. Also, the non-aqueous electrolyte 15 contains a non-aqueous solvent and an electrolyte salt dissolved in the non-aqueous solvent.

As the non-aqueous solvent contained in the non-aqueous electrolyte 15, a carbonate compound (for example, a cyclic carbonate compound and chain carbonate compound), lactone, ether, ester, or the like may be used. These solvents may be used in combinations of two or more. Among these compounds, particularly, a cyclic carbonate compound and a chain carbonate compound are preferably mixed upon use.

Examples of the electrolyte salt contained in the non-aqueous electrolyte 15 may include $LiCF_3SO_3$, $LiAsF_6$, $LiClO_4$, $LiBF_4$, $LiPF_6$, LiBOB, $LiN(CF_3SO_2)_2$, and $LiN(C_2F_5SO_2)$.

Also, additives such as a flame retardant may be formulated in the non-aqueous electrolyte 15 according to the need.

Experiment for Preparing Positive Electrode Active Material Powder

A carbonaceous coating film (conductive coating film) was formed on a surface of lithium-iron phosphate ($LiFePO_4$) powder by using a different carbon precursor to prepare positive electrode material powders (1) to (4). Specifically, these powders were prepared in the following manner.

1. Preparation of Positive Electrode Active Material Powder (1)

(1) Pretreatment of Positive Electrode Active Material

A lithium-iron phosphate reagent (manufactured by Toshima Manufacturing Co., Ltd.) that was raw material of positive electrode active material was dried by heating at 350° C. in a nitrogen atmosphere for 5 hours to remove water adsorbed to the surface.

(2) Preparation of Carbon Precursor Solution

Ethylene tar pitch (carbon precursor) was diluted with acetone to prepare a carbon precursor solution containing 20% by weight of ethylene tar pitch.

(3) Treatment for Sticking Carbon Precursor to Positive Electrode Active Material The pretreated material for a positive electrode active material (480 g) was added to 100 g of the above carbon precursor solution and the mixture was kneaded using a planetary mixer rotated at 20 rpm for one hour in a dry box where dew point was controlled. Thereafter, the mixture was heated to 40° C. in an oven capable of removing solvents to remove acetone used as the diluting solvent, thereby preparing a mixture containing 4% by weight of carbon.

(4) Carbonization Treatment

The above mixture was subjected to carbonization treatment performed at 700° C. in a nitrogen atmosphere for 2 hours in an electric furnace to prepare a positive electrode active material powder (1).

2. Preparation of Positive Electrode Active Material Powder (2)

Reformed ethylene tar pitch (carbon precursor) containing no quinoline insoluble content was diluted with acetone to prepare a carbon precursor solution containing 20% by weight of reformed ethylene tar pitch. This carbon precursor solution was used to prepare a positive electrode active material powder (2) in the same manner as in the preparation of positive electrode active material powder (1).

3. Preparation of Positive Electrode Active Material Powder (3)

Pyrene (carbon precursor) was diluted with acetone to prepare a carbon precursor solution containing 20% by weight of pyrene. This carbon precursor solution was used to prepare a positive electrode active material powder (3) in the same manner as in the preparation of positive electrode active material powder (1).

4. Preparation of Positive Electrode Active Material Powder (4)

Sucrose (carbon precursor) was diluted with acetone to prepare a carbon precursor solution containing 20% by weight of sucrose. This carbon precursor solution was used to prepare a positive electrode active material powder (4) in the same manner as in the preparation of positive electrode active material powder (1).

Experiment for Manufacturing Lithium Ion Secondary Battery (Reference Experiment)

The positive electrode active material powder (1) was used to manufacture a positive electrode (1), the positive electrode active material powder (2) was used to manufacture a positive electrode (2), the positive electrode active material powder (3) was used to manufacture a positive electrode (3), and the positive electrode active material powder (4) was used to manufacture a positive electrode (4). The positive electrodes had the same structure except for the positive electrode material powder. Specifically, the positive electrodes were manufactured in the following manner.

First, the positive electrode active material powder (1), (2), (3), or (4), acetylene black (conductive auxiliary agent), and polyvinylidene fluoride (PVDF (($CH_2CF_2)_n$)) (binder) were blended such that the amounts of the positive electrode active material powder and the conductive auxiliary agent were 88 to 95% by weight and 3.5 to 4.5% by weight respectively based on 100% by weight of the total content. N-methyl pyrrolidone was added to this mixture powder, which was then kneaded to prepare a positive electrode active material paste. This positive electrode active material paste was applied to a surface of an aluminum foil (positive electrode current collector sheet) and a resulting coating film was dried to form a positive electrode active material layer on the positive electrode current collector sheet, thereby manufacturing the positive electrodes (1) to (4).

Next, the positive electrode (1) was used to manufacture a lithium ion secondary battery (1), the positive electrode (2) was used to manufacture a lithium ion secondary battery (2), the positive electrode (3) was used to manufacture a lithium ion secondary battery (3), and the positive electrode (4) was used to manufacture a lithium ion secondary battery (4). The batteries had the same structure except for the positive electrode. Specifically, the batteries were manufactured in the following manner.

A power generation element obtained by laminating the positive electrode (1), (2), (3), or (4), a polyolefin separator (shutdown temperature: about 120° C.), and a carbonaceous negative electrode was put in a battery container with a lid member including a safety valve and a non-aqueous electrolyte solution was poured into the battery container to thereby manufacture the lithium ion secondary batteries (1), (2), (3), and (4). As the non-aqueous electrolyte solution, a 1 M LiPF$_6$ electrolyte solution was used which contained a carbonate type solvent (EC:DEC:EMC=1:1:1), additives (1 part by weight of VC and 1 part by weight of FEC based on 100 parts by weight of the electrolyte solution), and LiPF$_6$ that was an electrolyte.

Overcharge Test (1) (Reference Test)

Overcharge tests were performed for the manufactured lithium ion secondary batteries (1) to (4). Specifically, the tests were performed in the following manner.

First, the manufactured battery was charged in the condition of a charge current of 50 A and an upper limit voltage of 3.5 V for 6 hours to perform an overcharge test after fully charged. The charge current was 50 A that was 1 ItA (1CA) and the test upper voltage was 10 V to perform Constant-Current-Constant-Voltage (CCCV) charging in the overcharge test. In this case, the voltage between the external connection terminal of the positive electrode and the external connection terminal of the negative electrode and the current flowing between these external connection terminals were measured in the overcharge test. Also, in the overcharge test, a thermocouple was attached to the battery container to measure temperature.

Test results are shown in Table 1.

TABLE 1

| | Safety valve after overcharging | Temperature rise when overcharged | Maximum temperature when overcharged |
|---|---|---|---|
| Battery (1) | Closed | 32.8° C. | 60.7° C. |
| Battery (2) | Closed | 39.2° C. | 66.9° C. |
| Battery (3) | Opened | 91.9° C. | 112.9° C. |
| Battery (4) | Opened | 83.8° C. | 113.2° C. |

The results of the overcharge test for the lithium ion secondary battery (1) are shown in FIG. 8 and the results of the overcharge test for the lithium ion secondary battery (3) are shown in FIG. 9. The abscissas of FIGS. 8 and 9 each depict test time (minute) provided that the time at which the overcharge test starts is 0 (minute). Also, FIGS. 8(c) and 9(c) each depict a temperature rise from the temperature measured at the start of the overcharge test.

With regard to the battery (3), the voltage between the positive electrode and the negative electrode increased to about 5.5 V and then became constant when the charging was continued in an overcharged state as indicated by the voltage curve shown in FIG. 9(a). Then, the voltage sharply increased at 12 minutes of the test time, and the positive electrode-negative electrode voltage reached the upper limit voltage of the test at around 13 minutes of the test time.

Also, with regard to the battery (3), the current between the positive electrode and the negative electrode suddenly dropped and almost stopped flowing at 13 minutes of the test time as indicated by the current curve shown in FIG. 9(b).

Moreover, with regard to the battery (3), the temperature rise of the battery container reached about 90° C. as shown in FIG. 9(c). In addition, the safety valve in the battery (3) was opened, so that the electrolyte solution in the battery container spouted.

With regard to the battery (3), it is considered that since the voltage between the positive electrode and the negative electrode sharply increased and the current suddenly dropped at 12 to 13 minutes of the test time, the temperature in the battery reached 120° C. or higher, giving rise to shutdown of separator pores with result that the path of conductive ions in the battery was blocked.

In addition, the same voltage behaviors, current behaviors, and temperature behaviors were also exhibited as in the overcharge test of the battery (3) in the overcharge test of the lithium ion secondary battery (4).

With regard to the battery (1), when the battery was continuously charged in an overcharged state as indicated by the voltage curve shown in FIG. 8(a), the voltage between the positive electrode and the negative electrode gradually increased and reached the upper limit voltage of the test after about 7 to 10 minutes of the test time. It was found that the battery (1) increased in voltage more slowly than the battery (3).

Also, with regard to the battery (1), when the voltage between the positive electrode and the negative electrode reached the upper limit voltage of the test at around 7 to 10 minutes of the test time, the current flowing between the positive electrode and negative electrode gradually decreased and almost stopped at 12 to 14 minutes of the test time as indicated by the current curve shown in FIG. 8(b). The battery (1) exhibited a behavior different from the phenomenon that current suddenly stopped like that was seen when a separator was shut down.

Also, with regard to the battery (1), though the temperature of the battery gradually increased until 10 to 12 minutes passed, it thereafter became constant as indicated by the temperature rise curve shown in FIG. 8(c). The temperature rise of the battery (1) was about 30° C. and it is therefore considered that the inside temperature of the battery did not reach the shutdown temperature of the separator. It is to be noted that the safety valve was kept closed in the battery (1).

With regard to the battery (1), the voltage between the positive electrode and the negative electrode gradually increased and the current flowing between the positive electrode and negative electrode gradually decreased, and it is therefore considered that the internal resistance of the battery gradually increases when the battery is put into an overcharged state.

It is to be noted that in the overcharge test of the lithium ion secondary battery (2), the same voltage behaviors, current behaviors, and temperature behaviors were exhibited as in the overcharge test of the battery (1).

Battery Disassembling Experiment after Overcharge Test (Reference Experiment)

The positive electrodes (1) and (3) were taken out of the lithium ion secondary batteries (1) and (3) after the overcharge test to measure each electric resistance of the positive electrodes (1) and (3) by using a four-terminal method. Also, each electric resistance of the positive electrodes (1) and (3) before each positive electrode was incorporated into the battery was also measured.

Also, each separator was taken out from the lithium ion secondary batteries (1) and (3) after the overcharge test to perform air permeability tests. The air permeability tests for the separators before the separators were incorporated into the battery were also performed. In the air permeability tests, an air permeability tester (Gurley tester) was used to measure the air permeability. In these tests, the time required for a defined volume of air to transmit through a unit area is measured.

The results of these tests are shown in Table 2.

TABLE 2

|  | Electric resistance of Positive electrode of Battery (1) | Electric resistance of Positive electrode of Battery (3) | Air permeability of Separator of Battery (1) | Air permeability of Separator of Battery (3) |
| --- | --- | --- | --- | --- |
| Before incorporation of Battery | 0.21 Ω·m | 0.15 Ω·m | 440 sec/100 ml | 440 sec/100 ml |
| After Overcharge test | 527 Ω·m | 8.9 Ω·m | 570 sec/100 ml | 10000 sec/100 ml or more (unmeasurable) |

It was found from the results shown in Table 2 that the resistance of the positive electrode (1) after the overcharge test was 500 Ω·m or more, which was outstandingly higher than that of the positive electrode (1) measured before the positive electrode (1) was incorporated into the battery. On the other hand, the resistance of the positive electrode (3) after the overcharge test was about 9 Ω·m and it was therefore found that the increase in the resistance of the positive electrode (3) was small.

From the above findings, it was found that the rise in the internal resistance of the battery in the overcharge test of the battery (1) was caused by the rise in the internal resistance of the positive electrode (1).

On the other hand, it was found that the rise in the internal resistance of the battery in the overcharge test of the battery (3) was not caused by the rise in the internal resistance of the positive electrode (3).

Also, from the results shown in Table 2, the air permeability of the separator of the battery (1) was about 1.3 times the air permeability of the unused separator. On the other hand, when the air permeability of the separator taken out of the battery (3) after the overcharge test was measured, the value of air permeability was so large that it could not be measured.

From this, it was found that in the overcharge test of the battery (1), the internal temperature of the battery did not reach the shutdown temperature of the separator. It was also found that the rise in the internal resistance of the battery (1) in the overcharge test was not caused by the blocking of pores of the separator.

Also, it was found in the overcharge test for the battery (3) that the internal temperature of the battery reached the shutdown temperature of the separator. For this, it is considered that separator pores were blocked so that the path of conductive ions in the battery was shut, causing a sharp rise of the voltage between the positive electrode and the negative electrode, leading to a sharp current drop.

Also, the positive electrode (2) and separator were taken out of the battery (2) after the overcharge test to perform measurement of the electric resistance of the positive electrode (2) and air permeability test of the separator. The results of the air permeability of the battery (2) showed that the separator was not be shut down similarly to that of the battery (1). Also, the results of the measurement of electric resistance of the positive electrode of the battery (2) showed that the electric resistance of the positive electrode (2) was increased similarly to the case of the battery (1). It is considered from the above result that the same phenomenon that occurred in the battery (1) also occurred in the battery (2).

Also, the positive electrode (4) and separator were taken out of the battery (4) after the overcharge test to perform measurement of the electric resistance of the positive electrode (4) and air permeability test of the separator. Also, the results of the measurement of air permeability of the battery (4) showed that the separator was shut down similarly to the case of the battery (3). It is considered from the above result that the same phenomenon that occurred in the battery (3) also occurred in the battery (4).

TEM Observation

The carbonaceous coating film contained in the positive electrode active material powder (1) was directly observed using a transmission electron microscope. Also, the carbonaceous coating film contained in the positive electrode active material powder (3) was directly observed. In this case, flaking treatment was not performed.

FIG. 10(a) is a view of a TEM image of the positive electrode active material powder (1) and FIG. 10(b) is an enlarged image of the area C enclosed by the dotted line in FIG. 10(a).

The thickness of the carbonaceous coating film was found to be about 4 nm from FIG. 10. Also, the carbonaceous coating film was found to have a plurality of basic structure units 10 (BSU) that were each a structure in which a plurality of carbon hexagonal network planes 4 lay on top of one another. Also, it was found that the plurality of basic structure units 10 were oriented so as to face the surface of the positive electrode active material particle 6 and the carbonaceous coating film had an oriented structure in which the basic structure units 10 were oriented. It was also found from the above results that the carbonaceous coating film was graphitizable carbon (soft carbon).

Also, the average size of the plurality of carbon hexagonal network planes 4 was about 4.5 nm.

The carbonaceous coating film contained in the positive electrode active material powder (2) was directly observed. The carbonaceous coating film had an oriented structure in which the basic structure units 10 were oriented though not shown and was graphitizable carbon (soft carbon). Also, the average size of the plurality of carbon hexagonal network planes 4 was about 3.2 nm.

FIG. 11(a) is a TEM image of the positive electrode active material powder (3) and FIG. 11(b) is an enlarged image of the area D enclosed by the dotted line in FIG. 11(a).

From FIG. 11, the carbonaceous coating film was found to have an intricate structure of small carbon hexagonal network planes 4. From this, the carbonaceous coating film was found to be non-graphitizable carbon (hard carbon). Also, the average size of the plurality of carbon hexagonal network planes 4 was about 1.5 nm.

The carbonaceous coating film contained in the positive electrode active material powder (4) was directly observed. Though not shown, the carbonaceous coating film was non-graphitizable carbon (hard carbon) having an intricate structure of small carbon hexagonal network planes 4 and the average size of the plurality of carbon hexagonal network planes 4 was about 1.6 nm.

Voltage Application Experiment

In order to investigate the electric resistance of the carbonaceous coating film in an overcharged state, positive electrodes (5) to (7) each having a different kind of carbon layer 42 were produced and beaker cells (1) to (3) shown in FIG. 12 were manufactured using these positive electrodes (5) to (7) respectively, to perform a voltage application experiment that was hypothetically assumed to be an overcharge test. A paste prepared by mixing a graphitizable carbon (soft carbon) powder with a binder (PVDF) was applied to the surface of an aluminum foil 41 to form a carbon layer 42a, thereby producing a positive electrode (5). A beaker cell (1) was manufactured using this positive electrode (5). As the graphitizable carbon powder, KANJ-9 (manufactured by MT Carbon Co., Ltd.) that was cokes type soft carbon was used.

Also, a positive electrode (6) having a carbon layer 42b formed using non-graphitizable carbon (hard carbon) powder was manufactured to thereby manufacture a beaker cell (2) in the same method. As the non-graphitizable carbon powder, CARBOTRON P (manufactured by Kureha Battery Materials Japan Co., Ltd.) was used.

A positive electrode (7) having a carbon layer 42c formed using a graphite powder was manufactured and a beaker cell (3) was manufactured in the same method. As the graphite powder, KGNJ-9 (manufactured by MT Carbon Co., Ltd.) produced by baking cokes type carbon was used.

The manufactured carbon layers 42a, 42b, and 42c each had high conductivity.

In this case, as the non-aqueous electrolyte 15, a 1 M $LiPF_6$ electrolyte solution containing a carbonate type solvent (EC:DEC=3:7) and $LiPF_6$ as an electrolyte was used. As the negative electrode 32, a metal lithium foil was used. In the voltage application experiment, the upper limit voltage was 7 V to perform the experiment by applying charge voltage between the positive and negative electrodes to thereby create 10 mA constant current flow.

The test results are shown in FIG. 13. In the beaker cell (1) using the positive electrode (5) having the carbon layer 42a that is soft carbon, the terminal voltage increased to about 5.3 V at 0 to 10 seconds of the test time and then gradually increased to about 6 V at around 10 to 220 seconds of the test time. Then, the terminal voltage sharply increased and reached to the test upper limit voltage.

In the beaker cell (2) using the positive electrode (6) having the carbon layer 42b made of hard carbon, the terminal voltage was increased to about 6.2 V at around 0 to 15 seconds of the test time and then, became constant.

In the beaker cell (3) using the positive electrode (7) having the carbon layer 42c made of graphite, the terminal voltage sharply increased to about 5.0 V at around 0 to 2 seconds of the test time and then gradually increased to about 6.2 V at around 2 to 275 seconds of the test time. Then, the terminal voltage became constant at about 6.2 V.

In the beaker cell (1), the terminal voltage reached the test upper limit voltage. It is considered that soft carbon was made to have high resistance while the terminal voltage increased to about 6 V from about 5.3 V and when the terminal voltage exceeded about 6 V, the increase in the resistance of soft carbon was finished, which involved difficult current flow toward the carbon layer 42a with the result that the terminal voltage reached the test upper limit voltage. Also, it is considered that soft carbon was oxidized by $LiPF_6$ in the electrolyte at 10 to 220 seconds of the test time.

In the beaker cell (2) using hard carbon for the carbon layer 42 of the positive electrode, hard carbon did not participate in the electrochemical reaction and the terminal voltage increased continuously and became constant at a voltage of about 6.2 V.

Also, in the beaker cell (3) using graphite for the carbon layer 42 of the positive electrode, it was observed that graphite participated in the electrochemical reaction at a voltage of about 5.0 V. However, because graphite had a stable structure, the increase in the resistance of the carbon layer 42 was not attained and the terminal voltage therefore became constant at about 6.2 V.

In addition, it is considered that a carbonate type solvent electrochemically reacts in the range where the terminal voltage is constant at about 6.2 V.

From the results of the above TEM observation and voltage application experiment, it is thought that the rise in the internal resistance of the lithium ion secondary battery (1) measured in the above overcharge test (1) and the rise in the electric resistance of the positive electrode (1) measured in the above battery disassembling experiment are caused by the increase in the electric resistance of the carbonaceous coating film that is graphitizable carbon (soft carbon).

Also, it was also found from the results of the above voltage application experiment that non-graphitizable carbon (hard carbon) and graphite were not made to have high resistance in an overcharged state. It is therefore considered that since the carbonaceous coating film and conductive auxiliary agent 7 are non-graphitizable carbon in the lithium ion secondary battery (3) inspected in the above overcharge test (1), the carbonaceous coating film and conductive auxiliary agent 7 each have high conductivity even in the case where the battery is put into an overcharged state and the potential of the positive electrode is increased. Accordingly, it is thought that current flows into the positive electrode active material layer 1 through the carbonaceous coating film and conductive auxiliary agent 7 even in overcharged state and it is also thought that the electrolyte contained in the non-aqueous electrolyte 15 and the non-aqueous solvent are electrochemically degraded or reacted, causing exothermic heat in the positive electrode active material layer 1. Also, in this case, it is thought that current flows into the carbonaceous coating film and conductive auxiliary agent 7 to cause generation of heat. It is considered that the exothermic heat caused the electrolyte solution 15 to boil and hence the safety valve to open.

Overcharge Test (2)

The positive electrode active material powder (1) prepared in the above experiment for preparing a positive electrode active material powder was used to manufacture a positive electrode (8) and also, a beaker cell (4). Specifically, these electrode and beaker cell were manufactured in the following manner.

The positive electrode active material powder (1), soft carbon powder (conductive auxiliary agent), and binder (PVDF) were blended such that the amounts of the positive electrode active material powder, soft carbon powder, and binder were 91% by weight, 4% by weight, and 5% by weight respectively based on the total amount of 100% by weight. As the soft carbon powder, KANJ-9 (manufactured by MT Carbon Co., Ltd.) that was cokes type soft carbon was used. N-methyl pyrrolidone was added in this mixture powder, which was then kneaded to prepare a positive electrode active material paste. This positive electrode active material paste was applied to the surface of an aluminum foil (positive electrode current collector sheet) (coating amount: about 10.5 mg) to form a positive electrode active material layer 1 on a positive electrode current collector sheet 3, thereby manufacturing a positive electrode (8).

This positive electrode (8) was used to manufacture a beaker cell (4). In this case, as the non-aqueous electrolyte solution 15, 1 M $LiPF_6$ electrolyte solution containing a carbonate type solvent (EC:DEC=3:7) and $LiPF_6$ as an electrolyte was used. A metal lithium foil was used as the negative electrode 32. In addition, no separator was formed.

A charge/overcharge test was performed using the beaker cell (4). In the charge/overcharge test, the test upper limit voltage was 7.5 V to perform this test by applying charge voltage between the positive electrode and negative electrode to thereby make a constant (about 0.6 C) current flow.

The results of the charge/overcharge test are shown in FIG. 14.

In the test of the beaker cell (4), the terminal voltage was stable at about 3.8 V in a charge period ranging from about 0 to 4350 sec. When the battery was overcharged beyond a fully charged state, the terminal voltage increased at around 4350 to 6520 sec, became constant at around 6520 to 7760 sec, and then, increased and reached the test upper limit voltage. From these results, it was confirmed that the internal resistance of the battery increased even in the case of installing no separator.

The positive electrode active material layer 1 of the positive electrode (8) contained in the beaker cell (4) contains soft carbon as the conductive auxiliary agent and no acetylene black. Also, the carbonaceous coating film on the surface of the positive electrode active material powder (1) is graphitizable carbon (soft carbon). For this, it is considered that graphitizable carbon is electrochemically oxidized in an overcharged state, causing the carbonaceous coating film and conductive auxiliary agent to have high resistance, resulting in that the internal resistance of the beaker cell (4) increased as shown in FIG. 14. In addition, it is inferred that the region where the terminal voltage is made to be constant at around 6520 to 7760 seconds is a region where soft carbon is electrochemically oxidized.

It has been therefore understood that the structure of the positive electrode active material layer 1 in which the carbonaceous coating film of the positive electrode active material powder is graphitizable carbon and the conductive auxiliary agent is graphitizable carbon allows the positive electrode active material layer 1 to have high resistance and can restrain current from flowing associated with exothermic heat into the positive electrode active material layer 1. Accordingly, it has been understood that when the positive electrode active material layer 1 is made to have the above structure, the exothermic heat of the battery in an overcharged state can be restrained, so that the rise in the internal pressure of the battery and hence the explosion of the battery can be prevented.

Overcharge Test (3)

A powder mixture of soft carbon and hard carbon was used as a conductive auxiliary agent (4 wt %) to manufacture beaker cells (5) to (8). Other structures were made to be the same as those of the beaker cell (4). A powder mixture of 80 wt % soft carbon+20 wt % hard carbon was used as the conductive auxiliary agent in the beaker cell (5), a powder mixture of 85 wt % soft carbon+15 wt % hard carbon was used as the conductive auxiliary agent in the beaker cell (6), a powder mixture of 90 wt % soft carbon+10 wt % hard carbon was used as the conductive auxiliary agent in the beaker cell (7), and a powder mixture of 95 wt % soft carbon+5 wt % hard carbon was used as the conductive auxiliary agent in the beaker cell (8). In this case, KANJ-9 (manufactured by MT Carbon Co., Ltd.) that was a soft carbon powder and CARBOTRON P (manufactured by Kureha Battery Materials Japan Co., Ltd.) that was a hard carbon powder were used to prepare the powder mixture.

An overcharge test was performed using the beaker cells (5) to (8). In the overcharge test, the test upper limit voltage was 7.0 V to perform this test by applying charge voltage between the positive electrode and negative electrode to thereby make a constant (about 0.6 C) current flow. Also, the positive electrode active material layer was deemed to be increased in resistance when the terminal voltage reached the test upper limit voltage in a prescribed time. The results of the overcharge test are shown in Table 3.

TABLE 3

|  | Beaker cell (5) | Beaker cell (6) | Beaker cell (7) | Beaker cell (8) |
| --- | --- | --- | --- | --- |
| Ratio of Soft carbon | 80 wt % | 85 wt % | 90 wt % | 95 wt % |
| Ratio of Hard carbon | 20 wt % | 15 wt % | 10 wt % | 5 wt % |
| Increase in Resistance of Positive electrode active material layer in Overcharge test | X | X | ○ | ○ |

In the tests of the beaker cells (5) and (6), the terminal voltage did not reach the test upper limit voltage in a prescribed time. It is considered that the resistance of the positive electrode active material layer was not increased since the positive electrode active material layer was formed using a conductive auxiliary agent with a relatively high hard-carbon content in these cells.

In the tests of the beaker cells (7) and (8), the terminal voltage reached the test upper limit voltage in a prescribed time. It is considered that the resistance of the positive electrode active material layer was increased since the positive electrode active material layer was formed using a conductive auxiliary agent with a relatively low hard-carbon content and a relatively high soft-carbon content in these cells.

REFERENCE SIGNS LIST

1: Positive electrode active material layer
2: Base layer
3: Positive electrode current collector sheet
4: Carbon hexagonal network plane
5: Positive electrode
6: Positive electrode active material particle
7: Conductive auxiliary agent
8: Carbonaceous coating film
9: Pore
10: Basic structure unit (BSU)
11: Battery case
12: Lid member
13: Positive electrode connection member
14: Negative electrode connection member
15: Non-aqueous electrolyte
16a, 16b: Screw member
18a, 18b: External connecting terminal
20a, 20b: External insulating member
21a, 21b: Internal insulating member
22: Power generation element
25: Shrink film
30: Non-aqueous electrolyte secondary battery
32: Negative electrode
34: Separator
36: Negative electrode active material layer
38: Negative electrode current collector sheet
40a, 40b: Crip
41: Aluminum foil
42: Carbon layer
43: Positive electrode
45: Beaker cell

The invention claimed is:
1. A positive electrode for non-aqueous electrolyte secondary battery, the positive electrode comprising a positive electrode active material layer comprising a plurality of positive electrode active material particles, wherein the positive electrode active material layer comprises: a carbonaceous coating film formed on a surface of each of the positive electrode active material particles; and a conductive auxiliary agent disposed between the plurality of positive electrode active material particles, the conductive auxiliary agent is soft carbon, 90 wt % or more of a total amount of the carbonaceous coating film and the conductive auxiliary agent included in the positive electrode active material layer is soft carbon, the carbonaceous coating film and conductive auxiliary agent are amorphous carbon constituted of an aggregate of a plurality of basic structure units each having a structure in which a plurality of carbon hexagonal network planes are laminated, the carbonaceous coating film and conductive auxiliary agent have an oriented structure in which the plurality of basic structure units are oriented, and the carbonaceous coating film and the conductive auxiliary agent have a material density of 1.8 g/cm$^3$ or more and 2.1 g/cm$^3$ or less.

2. The positive electrode according to claim 1, wherein the positive electrode active material particles are olivine type compound particles or NASICON type compound particles.

3. The positive electrode according to claim 2, further comprising a positive electrode current collector sheet, wherein the positive electrode active material layer is formed on the positive electrode current collector sheet.

4. A non-aqueous electrolyte secondary battery comprising:

the positive electrode according to claim 3;

a negative electrode having a negative electrode active material;

a separator sandwiched between the positive electrode and the negative electrode;

a non-aqueous electrolyte; and a battery case in which the positive electrode, the negative electrode, the separator, and the non-aqueous electrolyte are accommodated.

5. The non-aqueous electrolyte secondary battery according to claim 4, wherein the negative electrode active material is a carbon material, the non-aqueous electrolyte is an electrolyte solution in which a lithium salt is dissolved in a non-aqueous solvent, and the carbonaceous coating film and the conductive auxiliary agent are soft carbon which is electrochemically degraded or reacted into highly resistant carbon in an overcharged state.

* * * * *